(12) United States Patent
Vail (10) Patent No.: US 8,146,687 B1
(45) Date of Patent: *Apr. 3, 2012

(54) POLYCRYSTALLINE DIAMOND COMPACT INCLUDING AT LEAST ONE THERMALLY-STABLE POLYCRYSTALLINE DIAMOND BODY AND APPLICATIONS THEREFOR

(75) Inventor: Michael A. Vail, Genola, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/149,137

(22) Filed: May 31, 2011

Related U.S. Application Data

(63) Continuation of application No. 12/367,739, filed on Feb. 9, 2009, now Pat. No. 7,971,663.

(51) Int. Cl.
*E21B 10/46* (2006.01)
(52) U.S. Cl. .................................. 175/426; 175/420.2
(58) Field of Classification Search ............... 175/420.2, 175/426, 428, 434, 435
See application file for complete search history.

(56) References Cited

U.S. PATENT DOCUMENTS

| | | |
|---|---|---|
| 2,941,248 A | 6/1960 | Hall |
| 4,268,276 A | 5/1981 | Bovenkerk |
| 4,274,900 A | 6/1981 | Mueller et al. |
| 4,380,471 A | 4/1983 | Lee et al. |
| 4,410,054 A | 10/1983 | Nagel et al. |
| 4,468,138 A | 8/1984 | Nagel |
| 4,560,014 A | 12/1985 | Geczy |
| 4,738,322 A | 4/1988 | Hall et al. |
| 4,811,801 A | 3/1989 | Salesky et al. |
| 4,913,247 A | 4/1990 | Jones |
| 4,919,220 A | 4/1990 | Fuller et al. |
| 5,016,718 A | 5/1991 | Tandberg |
| 5,092,687 A | 3/1992 | Hall |
| 5,120,327 A | 6/1992 | Dennis |
| 5,135,061 A | 8/1992 | Newton, Jr. |
| 5,154,245 A | 10/1992 | Waldenstrom et al. |
| 5,364,192 A | 11/1994 | Damm et al. |
| 5,368,398 A | 11/1994 | Damm et al. |
| 5,460,233 A | 10/1995 | Meany et al. |
| 5,480,233 A | 1/1996 | Cunningham |
| 5,544,713 A | 8/1996 | Dennis |
| 6,202,770 B1 | 3/2001 | Jurewicz et al. |
| 6,513,608 B2 | 2/2003 | Eyre et al. |
| 6,793,681 B1 | 9/2004 | Pope et al. |
| 7,377,341 B2 | 5/2008 | Middlemiss et al. |
| 7,384,592 B2 | 6/2008 | Weis et al. |
| 7,533,740 B2 * | 5/2009 | Zhang et al. .................. 175/432 |

(Continued)

OTHER PUBLICATIONS

U.S. Appl. No. 12/185,457, filed Aug. 4, 2008, Vail.

(Continued)

*Primary Examiner* — Daniel P Stephenson
(74) *Attorney, Agent, or Firm* — Workman Nydegger (57) ABSTRACT

Embodiments of the invention relate to PDCs including at least one thermally-stable PCD body disposed at least partially within a substrate, and methods of fabricating such PDCs. In an embodiment, a PDC comprises a substrate including a at least one substrate recess formed therein, and at least one thermally-stable PCD body including an upper surface, a back surface, and at least one lateral surface. The at least one thermally-stable PCD body is at least partially received by the at least one substrate recess. Other embodiments include applications utilizing the disclosed PDCs in various articles and apparatuses, such as rotary drill bits.

24 Claims, 9 Drawing Sheets

U.S. PATENT DOCUMENTS

| | | |
|---|---|---|
| 2005/0133277 A1 | 6/2005 | Dixon |
| 2006/0254830 A1 | 11/2006 | Radtke |
| 2008/0085407 A1 | 4/2008 | Cooley et al. |
| 2008/0206576 A1 | 8/2008 | Qian et al. |
| 2008/0230279 A1 | 9/2008 | Bitler et al. |
| 2009/0324873 A1 | 12/2009 | Weis et al. |
| 2010/0084197 A1 | 4/2010 | Voronin et al. |

OTHER PUBLICATIONS

U.S. Appl. No. 12/367,739, filed Feb. 9, 2009, Vail.
U.S. Appl. No. 12/367,739, May 24, 2010, Office Action.
U.S. Appl. No. 12/367,739, Nov. 8, 2010, Office Action.
U.S. Appl. No. 12/367,739, Mar. 3, 2011, Notice of Allowance.

* cited by examiner

POLYCRYSTALLINE DIAMOND COMPACT INCLUDING AT LEAST ONE THERMALLY-STABLE POLYCRYSTALLINE DIAMOND BODY AND APPLICATIONS THEREFOR

CROSS-REFERENCE TO RELATED APPLICATIONS

This application is a continuation of application Ser. No. 12/367,739 filed on 9 Feb. 2009, the contents of which are incorporated herein, in its entirety, by this reference.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented-carbide substrate into a container or cartridge with a volume of diamond particles positioned on a surface of the cemented-carbide substrate. A number of such cartridges may be loaded into an HPHT press. The substrate(s) and volume(s) of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of a matrix of bonded diamond grains having diamond-to-diamond bonding therebetween, with interstitial regions between the bonded diamond grains being occupied by the solvent catalyst.

The presence of the solvent catalyst in the PCD table is believed to reduce the thermal stability of the PCD table at elevated temperatures. For example, the difference in thermal expansion coefficient between the diamond grains and the solvent catalyst is believed to lead to chipping or cracking of the PCD table during drilling or cutting operations, which consequently can degrade the mechanical properties of the PCD table or cause failure. Additionally, some of the diamond grains can undergo a chemical breakdown or back-conversion to graphite via interaction with the solvent catalyst. At elevated high temperatures, portions of diamond grains may transform to carbon monoxide, carbon dioxide, graphite, or combinations thereof, causing degradation of the mechanical properties of the PCD table.

One conventional approach for improving the thermal stability of PDCs is to at least partially remove the solvent catalyst from the PCD table of the PDC by acid leaching. In another conventional approach for forming a PDC, a sintered PCD table may be separately formed and then leached to remove the solvent catalyst from interstitial regions between bonded diamond grains. The leached PCD table may be simultaneously HPHT bonded to a cemented-carbide substrate and infiltrated with a non-catalyst material, such as silicon, in a separate HPHT process. The silicon may infiltrate the interstitial regions of the leached PCD table from which the solvent catalyst has been leached and react with the diamond grains to form silicon carbide.

Despite the availability of a number of different PDCs, manufacturers and users of PDCs continue to seek PDCs that exhibit improved toughness, wear resistance, and/or thermal stability.

SUMMARY

Embodiments of the invention relate to PDCs including a barrier receptacle that holds a thermally-stable PCD body at least partially within a substrate and functions as a barrier to prevent metal-solvent catalyst from interacting with the thermally-stable PCD body during manufacture and/or use thereof. In an embodiment, a PDC comprises a substrate including a substrate recess formed therein, a barrier receptacle defining a receptacle recess, and a thermally-stable PCD body including an upper surface, a back surface, and at least one lateral surface. The barrier receptacle is received by the substrate recess. The thermally-stable PCD body is at least partially received by the receptacle recess.

Other embodiments include applications utilizing the disclosed PDCs in various articles and apparatuses, such as rotary drill bits, machining equipment, and other articles and apparatuses.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to PDCs including a barrier receptacle that holds thermally-stable PCD body at least partially within a substrate and functions as a barrier to prevent interaction of metal-solvent catalyst with the thermally-stable PCD body during manufacture and/or use thereof, and methods of fabricating such PDCs. The disclosed PDCs may be used in a variety of applications, such as rotary drill bits, machining equipment, and other articles and apparatuses.

Figure 1A:
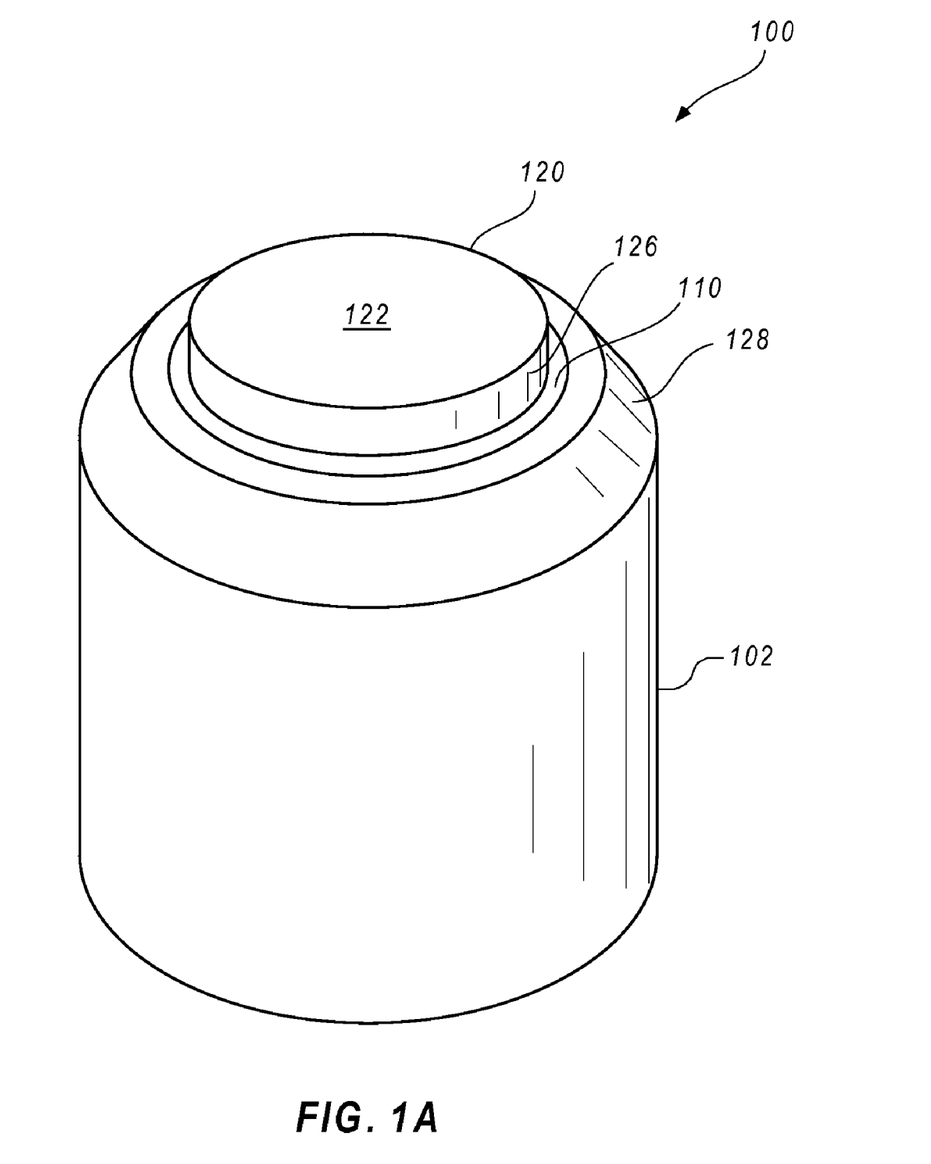
FIG. 1A is an isometric view of an embodiment of a PDC including a thermally-stable PCD body held in a barrier receptacle that is bonded to a substrate.
Figure 1B:
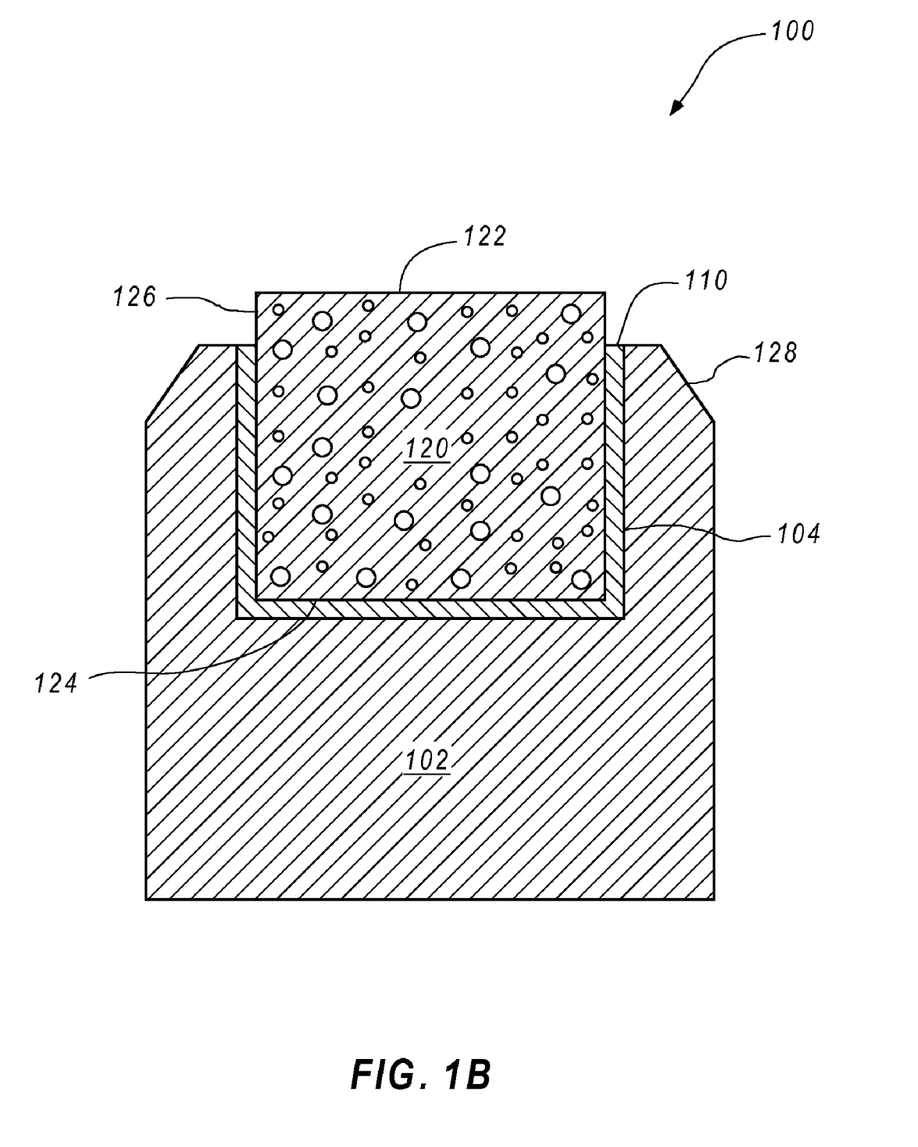
FIG. 1B is a cross-sectional view of the PDC shown in FIG. 1A.
Figure 1C:
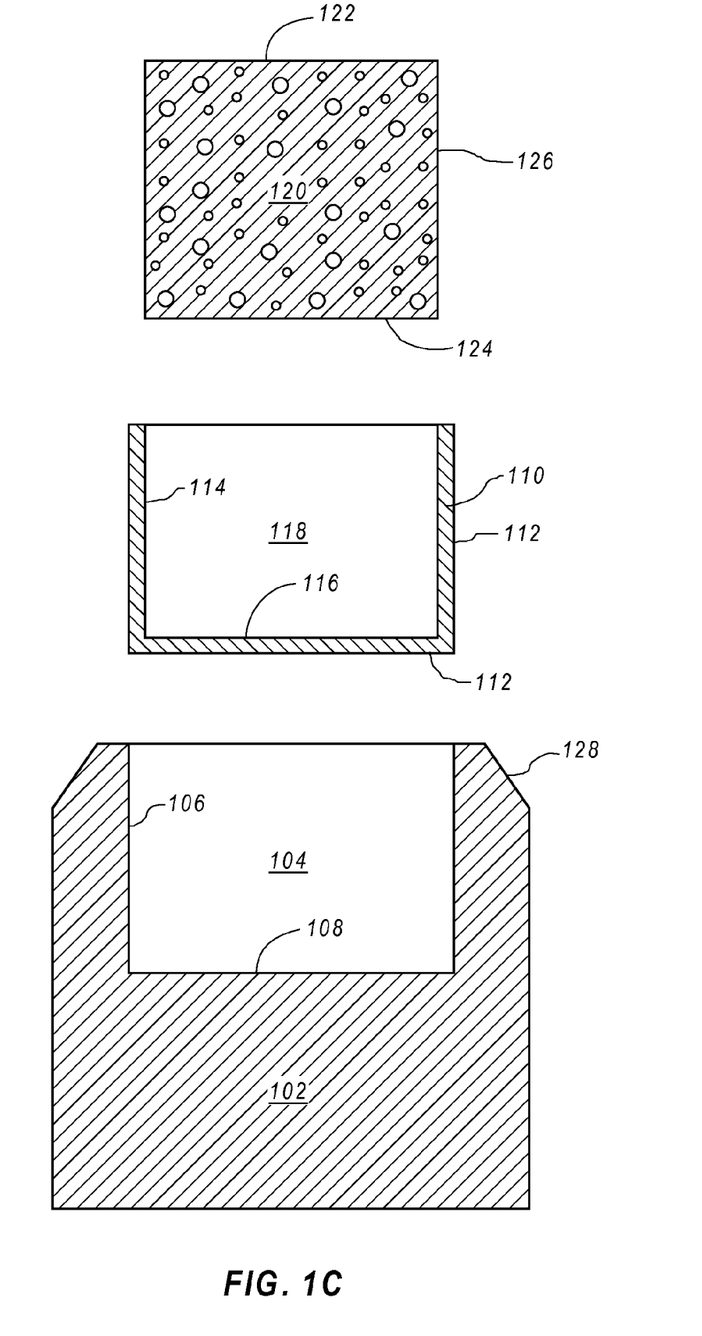
FIG. 1C is an exploded cross-sectional view of the PDC shown in FIG. 1B.

FIGS. 1A-1C are isometric, cross-sectional, and exploded cross-sectional views, respectively, of an embodiment of a PDC 100. The PDC 100 includes a substrate 102 having a substrate recess 104 (FIGS. 1B and 1C) formed therein. The substrate recess 104 (FIGS. 1B and 1C) is defined by at least one sidewall surface 106 (FIG. 1C) and a base surface 108 (FIG. 1C). The substrate 102 may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof. For example, in one embodiment, the substrate 102 comprises cobalt-cemented tungsten carbide.

The PDC 100 further includes a barrier receptacle 110 received by the substrate recess 104 (FIGS. 1B and 1C). A periphery 112 (FIG. 1C) of the barrier receptacle 110 is HPHT bonded to the at least one sidewall surface 106 (FIG. 1C) and the base surface 108 (FIG. 1C) of the substrate 102 defining the substrate recess 104 (FIGS. 1B and 1C). The barrier receptacle 110 includes at least one sidewall surface 114 (FIG. 1C) and a base surface 116 (FIG. 1C) defining a receptacle recess 118 (FIG. 1C). The barrier receptacle 110 may comprise a material that restricts migration of one or more constituents from the substrate 102 substantially into a thermally-stable PCD body 120 during manufacture and/or use of the PDC 100. For example, the barrier receptacle may comprise a refractory metal or alloy (e.g., tungsten, zirconium, niobium, vanadium, molybdenum, tantalum, or alloys thereof) or if compatible with the processing temperature steel, brass, an aluminum alloy, or other suitable material. For example, the barrier receptacle 110 may be formed in the shape of a cylindrical cup or other geometry from a sheet made from tungsten, zirconium, niobium, vanadium, molybdenum, tantalum, or alloys thereof. The barrier receptacle 110 may exhibit a thickness of about 0.00039 mm to about 0.50 mm. As will be described in more detail below, the barrier receptacle 110 functions as a barrier that helps limit metal-solvent catalyst present in the substrate 102 (e.g., cobalt in a cobalt-cemented tungsten carbide substrate) from interacting with the thermally-stable PCD body 120 received by the barrier receptacle 110 during manufacture and/or use of the PDC 100. The barrier receptacle 110 may also be metallurgically bonded to the thermally-stable PCD body 120 and the substrate 102.

The thermally-stable PCD body 120 is at least partially received by the receptacle recess 118 (FIG. 1C) of the barrier receptacle 110. The thermally-stable PCD body 120 includes a working upper surface 122, an opposing back surface 124 (FIGS. 1B and 1C), and at least one lateral surface 126 extending therebetween. It should be noted that at least a portion of the at least one lateral surface 126 may also function as a working surface that contacts a subterranean formation during drilling. In the illustrated embodiment, the thermally-stable PCD body 120 projects from the receptacle recess 118 (FIG. 1C) so that a portion of the at least one lateral surface 126 is not covered by the barrier receptacle 110 and the substrate 102. However, in other embodiments, the at least one lateral surface 126 may be substantially completely covered by the barrier receptacle 110 and the upper surface 122 may be configured to project outwardly from the substrate 102, such as with a convex configuration. Although in the illustrated embodiment, the thermally-stable PCD body 120 has a generally disc-shaped geometry, the configuration of the thermally-stable PCD body 120 may exhibit other selected noncircular configurations suitable for particular applications. Although not illustrated, in some embodiments, the thermally-stable PCD body 120 may include a chamfer.

In the illustrated embodiment, the substrate 102 includes a chamfer 128 configured so that the at least one lateral surface 126 and upper surface 122 may reliably contact a subterranean formation during drilling operations. However, in other embodiments, the substrate 102 may not include the chamfer 128 and the thermally-stable PCD body 120 may project outwardly a sufficient distance from the barrier receptacle 110.

The thermally-stable PCD body 120 includes a plurality of bonded diamond grains exhibiting diamond-to-diamond bonding therebetween, with the bonded diamond grains defining a plurality of interstitial regions. In one embodiment, the thermally-stable PCD body 120 is an at least partially leached PCD body in which metal-solvent catalyst used in the sintering process to form it has been leached therefrom so that the interstitial regions are substantially free of metal-solvent catalyst. However, residual amounts of the metal-solvent catalyst may be present in the thermally-stable PCD body 120 even after leaching. The thermal stability of the thermally-stable PCD body 120 is enhanced compared to a PCD body in which the metal-solvent catalyst has not been removed. In another embodiment, the interstitial regions include silicon carbide, cobalt carbide, a mixed carbide of cobalt and silicon, a cobalt-silicon alloy (e.g., a cobalt silicide), or combinations of the foregoing disposed therein. In a further embodiment, the interstitial regions include a nonmetallic catalyst, such as one or more alkali metal carbonates, one or more alkaline earth metal carbonates, one or more alkaline earth metal hydroxides, one or more alkaline earth metal hydroxides, phosphorous, sulfur, or combinations of the foregoing disposed therein. For example, the thermally-stable PCD body 120 may be fabricated from any of the PCD bodies manufactured using a nonmetallic carbonate catalyst disclosed in U.S. patent application Ser. No. 12/185,457, the disclosure of which is incorporated herein, in its entirety, by this reference.

In one embodiment, the thermally-stable PCD body 120 shown in FIGS. 1A-1C may be fabricated by subjecting a plurality of diamond particles to an HPHT sintering process in the presence of a metal-solvent catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metal-solvent catalyst may be mixed with the diamond particles, infiltrated from a metal-solvent catalyst foil or powder adjacent to the diamond particles, infiltrated from a metal-solvent catalyst present in a cemented-carbide substrate, or combinations of the foregoing. The bonded diamond grains, so-formed by HPHT sintering the diamond particles, define interstitial regions, with the metal-solvent catalyst disposed within the interstitial regions. The diamond particles may exhibit a single-mode diamond particle size distribution, or a bimodal or greater diamond particle size distribution.

The as-sintered PCD body may be leached by immersion in an acid, such as aqua regia, nitric acid, hydrofluoric acid, or subjected to another suitable process to remove at least a portion of the metal-solvent catalyst from the interstitial regions of the PCD body and form an at least partially leached PCD body. For example, the as-sintered PCD body may be immersed in the acid for about a few hours to about 7 days (e.g., about 1, 3, 5, or 7 days) or for a few weeks (e.g., about 4 weeks) depending on the process employed. It is noted that when the metal-solvent catalyst is infiltrated into the diamond particles from a cemented tungsten carbide substrate including tungsten carbide particles cemented with a metal-solvent catalyst (e.g., cobalt, nickel, iron, or alloys thereof), the infiltrated metal-solvent catalyst may carry tungsten and/or tungsten carbide therewith and the as-sintered PCD body may include such tungsten and/or tungsten carbide therein disposed interstitially between bonded diamond grains. The tungsten and/or tungsten carbide may be at least partially removed by the selected leaching process or may be relatively unaffected by the selected leaching process.

In an embodiment, the at least partially leached PCD body so-formed may be infiltrated with silicon or a silicon-cobalt alloy. In such an embodiment, the interstitial regions of the at least partially leached PCD body may be filled with silicon carbide, cobalt carbide, a mixed carbide of cobalt and silicon, a silicon-cobalt alloy (e.g., a cobalt silicide), or combinations of the foregoing.

The thermally-stable PCD body 120 may be subjected to a shaping process, such as grinding or lapping, to tailor the geometry thereof, as desired, for a particular application. For example, a chamfer or a radius may be formed on an edge of the as-sintered PCD body. When the thermally-stable PCD body 120 is an at least partially leached PCD body, it may also be shaped prior to leaching by a machining process, such as electro-discharge machining.

The plurality of diamond particles sintered to form the thermally-stable PCD body 120 may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 µm and 20 µm). More particularly, in various embodiments, the plurality of diamond particles may include a portion exhibiting a relatively larger size (e.g., 100 µm, 90 µm, 80 µm, 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 10 µm, 15 µm, 12 µm, 10 µm, 8 µm, 4 µm, 2 µm, 1 µm, 0.5 µm, less than 0.5 µm, 0.1 µm, less than 0.1 µm). In another embodiment, the plurality of diamond particles may include a portion exhibiting a relatively larger size between about 40 µm and about 15 µm and another portion exhibiting a relatively smaller size between about 12 µm and 2 µm. Of course, the plurality of diamond particles may also include three or more different sizes (e.g., one relatively larger size and two or more relatively smaller sizes) without limitation.

In another embodiment, the thermally-stable PCD body 120 may be fabricated by subjecting a plurality of diamond particles to an HPHT sintering process in the presence of a nonmetallic catalyst (e.g., one or more alkali metal carbonates, one or more alkaline earth metal carbonates, one or more alkaline earth metal hydroxides, or combinations of the foregoing) to facilitate intergrowth between the diamond particles and form a PCD body comprised of bonded diamond grains that exhibit diamond-to-diamond bonding therebetween. For example, the nonmetallic catalyst may be mixed with the diamond particles, infiltrated from at least one layer adjacent to the diamond particles, or combinations of the foregoing. The bonded diamond grains, so-formed by HPHT sintering the diamond particles, define interstitial regions, with the nonmetallic catalyst and/or a reaction product disposed within the interstitial regions.

In yet another embodiment, the thermally-stable PCD body 120 may be fabricated by directly converting graphite to polycrystalline diamond without the use of a catalyst. In such an embodiment, the thermally-stable PCD body 120 is substantially free of any catalyst material, such as a metal-solvent catalyst or a nonmetallic catalyst.

Figure 2:
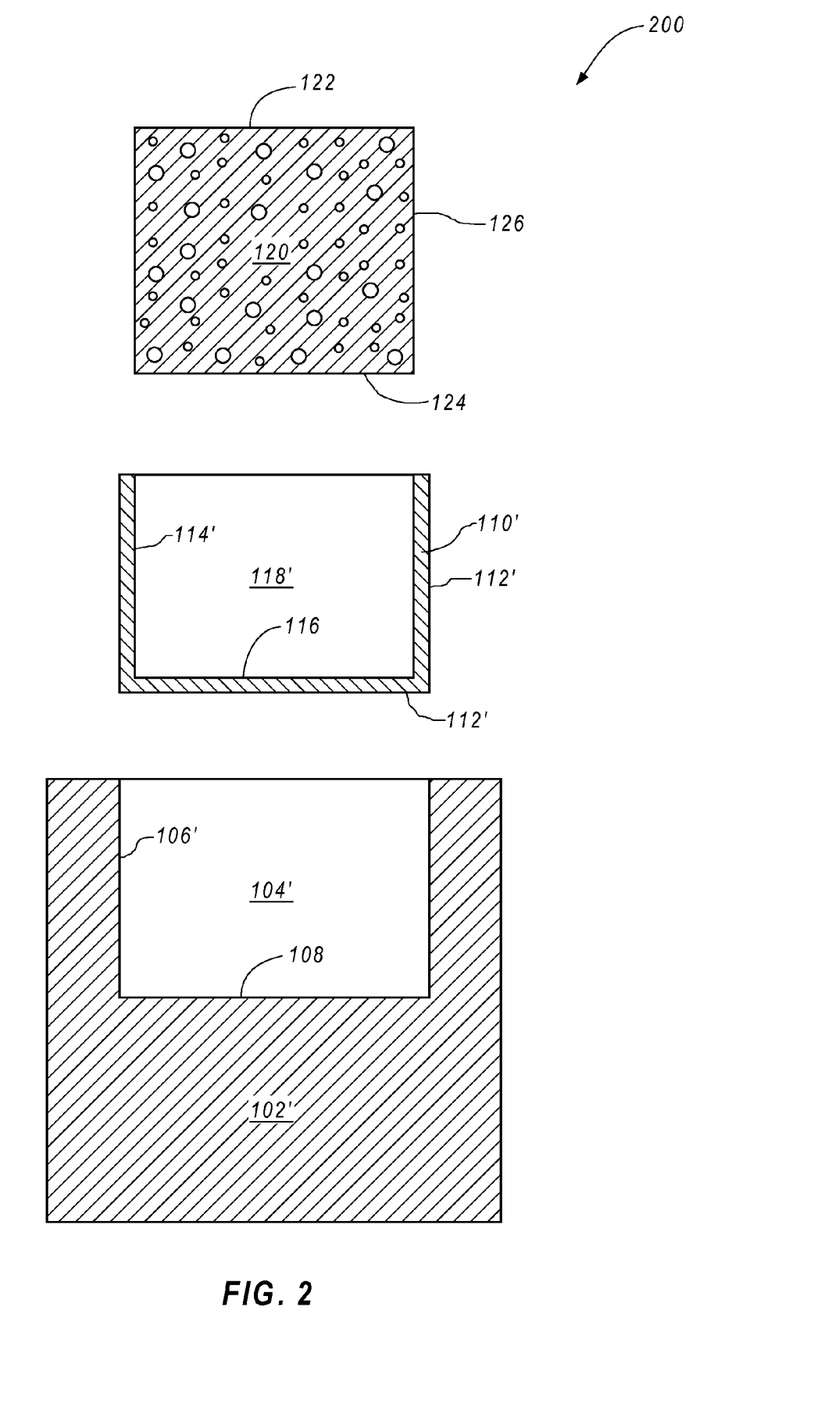
FIG. 2 is an exploded cross-sectional view of an assembly to be HPHT processed in order to form the PDC shown in FIGS. 1A-1C according to an embodiment of a method.
Figure 3:
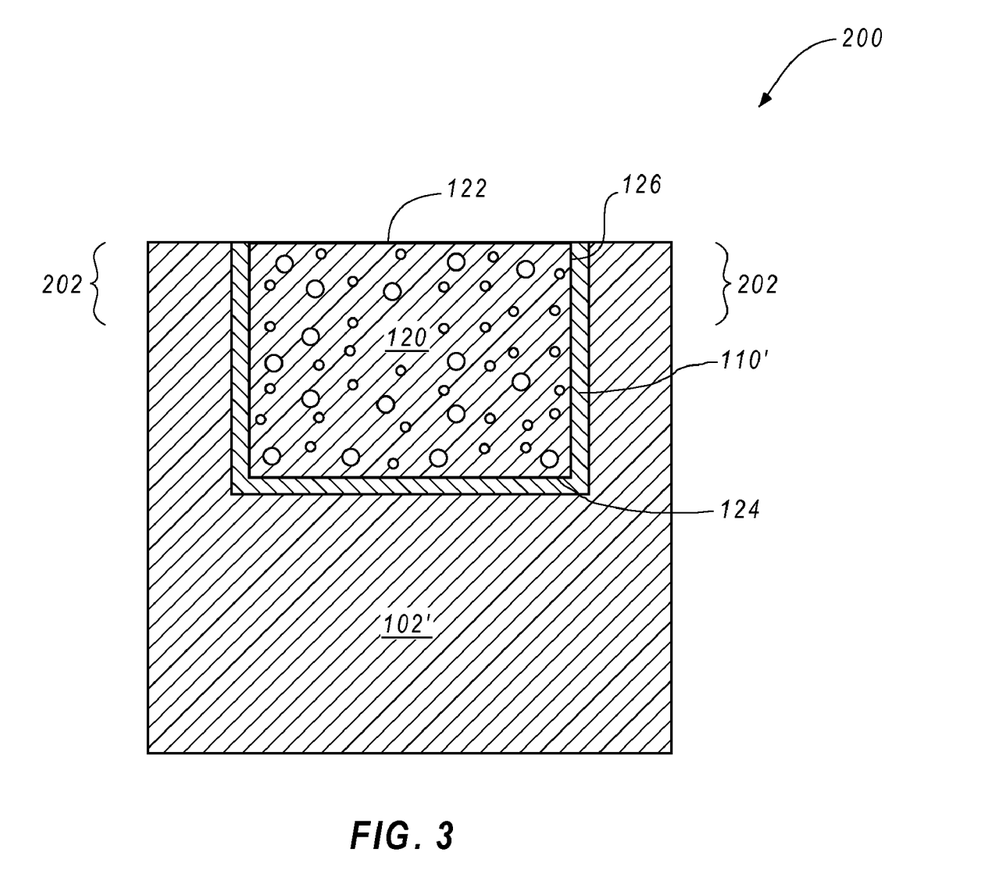
FIG. 3 is a cross-sectional view of the assembly shown in FIG. 2.

FIG. 2 is an exploded cross-sectional view of an assembly 200 to be HPHT processed in order to form the PDC 100 shown in FIGS. 1A-1C according to an embodiment of a method and FIG. 3 is a cross-sectional view of the assembly 200. A precursor substrate 102' may be provided that eventually forms part of the substrate 102 shown in FIGS. 1A-1C following final shaping of the precursor substrate 102'. A precursor substrate recess 104' (FIG. 2) may be machined in the precursor substrate 102' using a suitable machining process, such as electro-discharge machining. The precursor substrate recess 104' is defined by at least one precursor sidewall surface 106' (FIG. 2) and the base surface 108 (FIG. 2). A precursor barrier receptacle 110' may be inserted into the precursor substrate recess 104'. The precursor barrier receptacle 110' includes a precursor receptacle recess 118' (FIG. 2) defined by at least one precursor sidewall surface 114' (FIG. 2) and the base surface 116 (FIG. 2). A periphery 112' (FIG. 2) of the precursor barrier receptacle 110' has an exterior profile configured to generally correspond to the interior profile of the precursor substrate recess 104'. The thermally-stable PCD body 120 may be inserted into the precursor receptacle recess 118' prior to or after the precursor barrier receptacle 110' has been inserted into the precursor substrate recess 104' (FIG. 2).

The assembly 200 may be placed in a pressure transmitting medium, such as a refractory metal can embedded in pyrophyllite or other pressure transmitting medium. The pressure transmitting medium, including the assembly 200, may be subjected to a HPHT process using an ultra-high pressure press to create temperature and pressure conditions. In one embodiment, the HPHT conditions may be HPHT conditions at which diamond is stable. For example, the temperature of the HPHT process may be at least about 1000° C. (e.g., about 1200° C. to about 1600° C.) and the pressure of the HPHT process may be at least 4.0 GPa (e.g., about 5.0 GPa to about 8.0 GPa) for a time sufficient to metallurgically bond the precursor barrier receptacle 110' to the precursor substrate 102' and to the thermally-stable PCD body 120. For example, the pressure of the HPHT process may be about 5 GPa to about 7 GPa and the temperature of the HPHT process may be about 1150° C. to about 1400° C. (e.g., about 1200° C. to about 1300° C.). The HPHT process bonds the at least one precursor sidewall surface 114' (FIG. 2) and the base surface 116 (FIG. 2) of the precursor barrier receptacle 110' defining the precursor receptacle recess 118' to the back surface 124 and at least a portion of the at least one lateral surface 126 of the thermally-stable PCD body 120. The HPHT process may also bond the at least one precursor sidewall surface 106' (FIG. 2) and base 108 (FIG. 2) of the precursor substrate 102' defining the precursor substrate recess 104' (FIG. 2) to the periphery 112 (FIG. 2) of the precursor barrier receptacle 110'.

In an embodiment, the HPHT conditions may be HPHT conditions at which graphite is stable. For example, the pressure may be about 1 GPa to about 2 GPa and the temperature may be about 1150° C. to about 1400° C. However, the HPHT process time may be maintained sufficiently low so that thermally-stable PCD body 120 is not significantly degraded by graphitization.

Because the precursor barrier receptacle 110' extends about at least a portion of the at least one lateral surface 126 of the thermally-stable PCD body 120, metal-solvent catalyst from the precursor substrate 102' is substantially prevented from interacting with the thermally-stable PCD body 120 through the at least one lateral surface 126 during the HPHT process. For example, when the thermally-stable PCD body 120 is an at least partially leached PCD body, the precursor barrier receptacle 110' substantially prevents metal-solvent catalyst from the precursor substrate 102' from infiltrating into the at least partially leached PCD body. Thus, the precursor barrier receptacle 110' functions as a barrier against re-infiltration of the metal-solvent catalyst in the precursor substrate 102' so that the thermal stability of the at least partially leached PCD body is not reduced. In some embodiments, the base 116 of the precursor barrier receptacle 110' may exhibit a nonplanar geometry. Various configurations for refractory metal barriers (e.g., non-planar refractory metal barriers) are disclosed in U.S. Patent Application Publication No. 20080206576, the disclosure of which is incorporated herein, in its entirety, by this reference.

Additionally, because the precursor substrate 102' extends about at least a portion of the at least one lateral surface 126 of the thermally-stable PCD body 120, the thermally-stable PCD body 120 is laterally supported. Such lateral support may help prevent de-bonding of the thermally-stable PCD body 120 from the barrier receptacle 110 when the PDC 100 is subjected to lateral loading during subterranean drilling operations. Further, relatively increased residual compressive stresses may be developed in the thermally-stable PCD body 120 upon cooling from the high temperatures employed in the HPHT process compared to if the precursor substrate 102' did not extend about the at least one lateral surface 126 of the thermally-stable PCD body 120 and such compressive stresses at least partially remain even after shaping the precursor substrate 102' to form the substrate 102 (FIGS. 1A-1C). Such residual compressive stresses are due to the relatively higher coefficient of thermal expansion of the precursor substrate 102' than the thermally-stable PCD body 120 and, as discussed above, are enhanced due to geometry of the precursor substrate 102' and the final-shaped substrate 102 (FIGS. 1A-1C).

Referring specifically to FIG. 3, after HPHT processing the assembly 200, a peripheral region 202 adjacent to the thermally-stable PCD body 120 comprised of a portion of the precursor substrate 102' and a portion of the precursor barrier receptacle 110' of the HPHT processed assembly 200 may be removed via a material removal process, such as grinding, electro-discharge machining, or another suitable material removal process to expose a portion of the at least one lateral surface 126 of the thermally-stable PCD body 120 and, if desired, form a chamfer and/or a radius on the thermally-stable PCD body 120 and/or the precursor substrate 102'.

The thermally-stable PCD body 120 at least partially received by the barrier receptacle 110 may be secured at least partially within the substrate 102 by techniques other than HPHT bonding. In an embodiment, the thermally-stable PCD body 120 may be inserted into the receptacle recess 118 of the barrier receptacle 110 to form an assembly, and the assembly may be interference fit (e.g., press-fit) with the substrate 102 so that the barrier receptacle 110 is secured within the substrate recess 104 and the thermally-stable PCD body is secured at least partially within the receptacle recess 118. In some embodiments, the substrate 102 may be heated prior to insertion of the assembly therein so that the assembly is shrink-fit with the substrate 102.

Referring again to FIGS. 2 and 3, in another embodiment, the back surface 124 of the thermally-stable PCD body 120 may have a binderless carbide substrate deposited thereon or other ceramic material. For example, the binderless carbide substrate may comprise chemically- or physically-vapor deposited tungsten carbide that is substantially free of a metal-solvent catalyst, such as cobalt, iron, nickel, or alloys thereof. In such an embodiment, the binderless carbide substrate may be bonded to the barrier receptacle 110 using any of the above-described HPHT processes. In another embodiment, only the binderless carbide substrate may be received by the receptacle recess 118 and the thermally-stable PCD body 120 may project outwardly therefrom. As an alternative to bonding the binderless carbide substrate to the barrier receptacle 110, at least the binderless carbide substrate may be inserted into the receptacle recess 118 of the barrier receptacle 110 to form an assembly and the assembly interference fit with the substrate 102.

Although the PDC 100 shown in FIGS. 1A and 1B includes only a single thermally-stable PCD body 120, in other embodiments, a PDC may include a plurality of thermally-stable PCD bodies each of which may be held in a corresponding barrier receptacle. Such a PDC may be employed as a shear cutter on a rotary drill bit, and may be periodically rotated so a selected one of the thermally-stable PCD bodies thereof is used for cutting when other ones of the thermally-stable PCD bodies are worn.

Figure 4A:
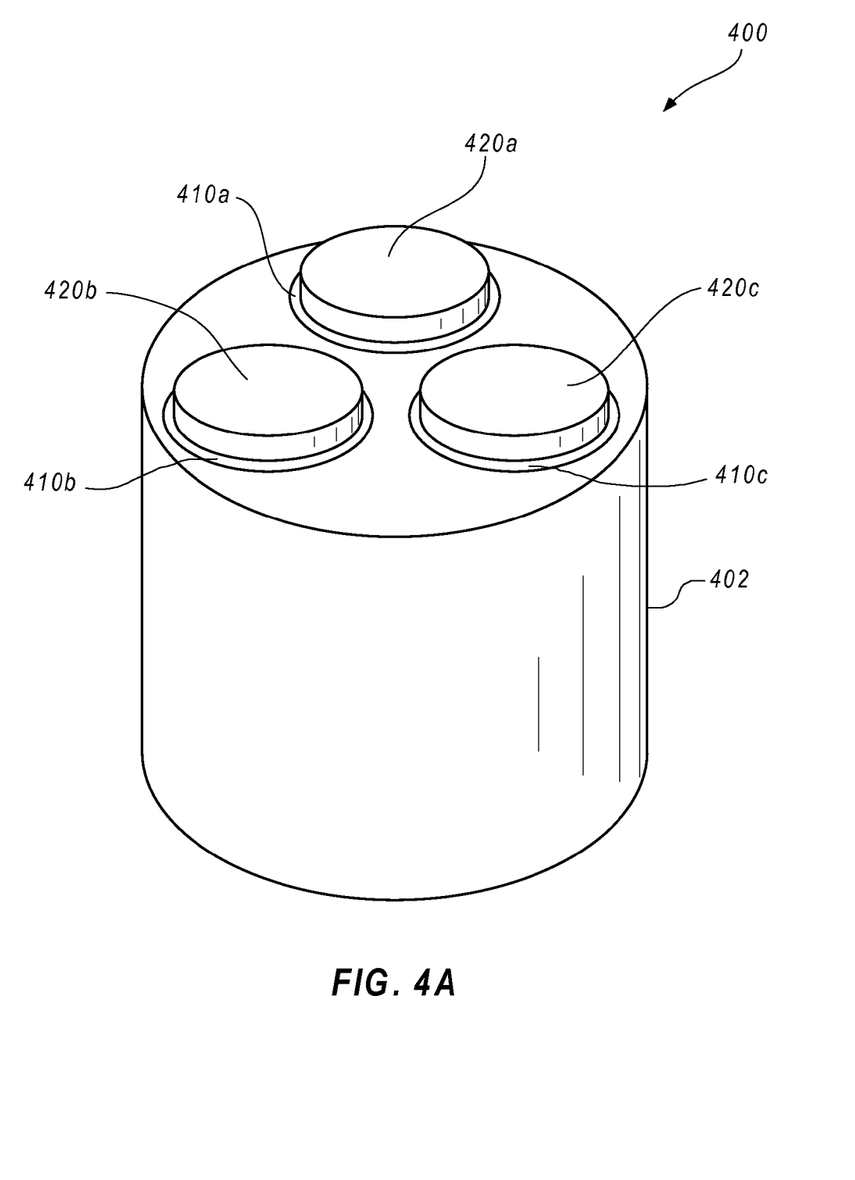
FIG. 4A is an isometric view of an embodiment of a PDC that includes a plurality of thermally-stable PCD bodies.

FIG. 4A is an isometric view of an embodiment of a PDC 400 that includes a plurality of thermally-stable PCD bodies. The PDC 400 comprises a substrate 402 including a plurality of substrate recesses (not shown) formed therein, a plurality of barrier receptacles 410a-410c, and a plurality of thermally-stable PCD bodies 420a-420c (e.g., two or more). Each barrier receptacle 410a-410c is received by and secured within a corresponding substrate recesses. Each thermally-stable PCD body 420a-420c may be at least partially received by and secured at least partially within a corresponding barrier receptacle 410a-410c. Each thermally-stable PCD body 420a-420c may project outwardly from the substrate 402 a sufficient distance to make reliable contact with a subterranean formation during drilling. The substrate 402 may be made from the same materials as the substrate 102 shown in FIGS. 1A and 1B, each thermally-stable PCD body 420a-420c may be fabricated in the same manner as the thermally-stable PCD body 120 shown in FIGS. 1A and 1B, and each barrier receptacle 410a-410c may be made from the same materials as the barrier receptacle 110.

The PDC 400 may be fabricated by machining recesses into a precursor substrate, inserting a precursor barrier receptacle in each recess so-formed, and inserting a thermally-stable PCD body in each precursor barrier receptacle to form an assembly. In an embodiment, the assembly may be subjected to HPHT conditions similar to those employed to form the PDC 100 shown in FIGS. 1A and 1B. In another embodiment, each precursor barrier receptacle including a corresponding thermally-stable PCD body at least partially received therein may be inserted into a corresponding machined recess and interference fit with the precursor substrate. Following HPHT processing or interference fitting, selected portions of the precursor substrate and precursor barrier receptacles may be selectively removed by, for example, machining and/or grinding so that each thermally-stable PCD body 420a-420c projects from the substrate 402 a selected distance.

Figure 4B:
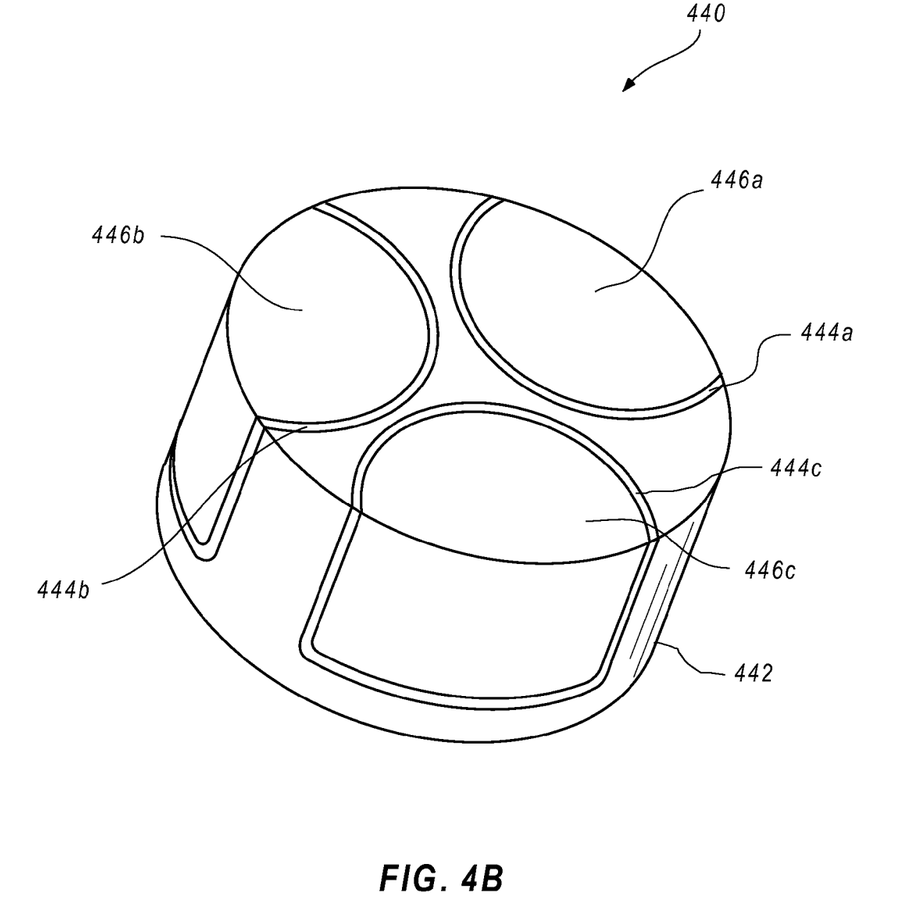
FIG. 4B is an isometric view of an embodiment of a PDC that includes a plurality of thermally-stable PCD bodies.

Other embodiments of PDCs that include multiple thermally-stable PCD bodies are contemplated. For example, FIG. 4B is an isometric view of another embodiment of a PDC 440 that comprises a substrate 442 including a plurality of substrate recesses (not shown) formed therein, a plurality of barrier receptacles 444a-444c, and a plurality of thermally-stable PCD bodies 446a-446c (e.g., two or more). Each barrier receptacle 444a-444c is received by and secured within a corresponding substrate recess. Each thermally-stable PCD body 446a-446c may be at least partially received by and secured at least partially within a corresponding barrier receptacle 444a-444c. The substrate recesses and corresponding barrier receptacles 444a-444c may be configured so that a lateral surface of each of the thermally-stable PCD bodies 446a-446c are exposed. In the illustrated embodiment, the thermally-stable PCD bodies 446a-446c do not project outwardly from the substrate 442. However, in other embodiments, each of the thermally-stable PCD bodies 446a-446c may project outwardly from the substrate 442. The substrate 442 may be made from the same materials as the substrate 102 shown in FIGS. 1A and 1B, each thermally-stable PCD body 446a-446c may be fabricated in the same manner as the thermally-stable PCD body 120 shown in FIGS. 1A and 1B, and each barrier receptacle 444a-444c may be made from the same materials as the barrier receptacle 110.

The PDC 440 may be fabricated by machining recesses into a precursor substrate, inserting a precursor barrier receptacle in each recess so-formed, and inserting a thermally-stable PCD body in each precursor barrier receptacle to form an assembly. In an embodiment, the assembly may be subjected to HPHT conditions similar to those employed to form the PDC 100 shown in FIGS. 1A and 1B. In another embodiment, each precursor barrier receptacle including a corresponding thermally-stable PCD body at least partially received therein may be inserted into a corresponding machined recess and interference fit with the precursor substrate. Following HPHT processing or interference fitting, selected portions of the precursor substrate, precursor barrier receptacles, and the thermally-stable PCD bodies may be selectively removed by, for example, machining and/or grinding until the lateral surfaces of each of the thermally-stable PCD bodies 446a-446c are exposed.

Figure 5:
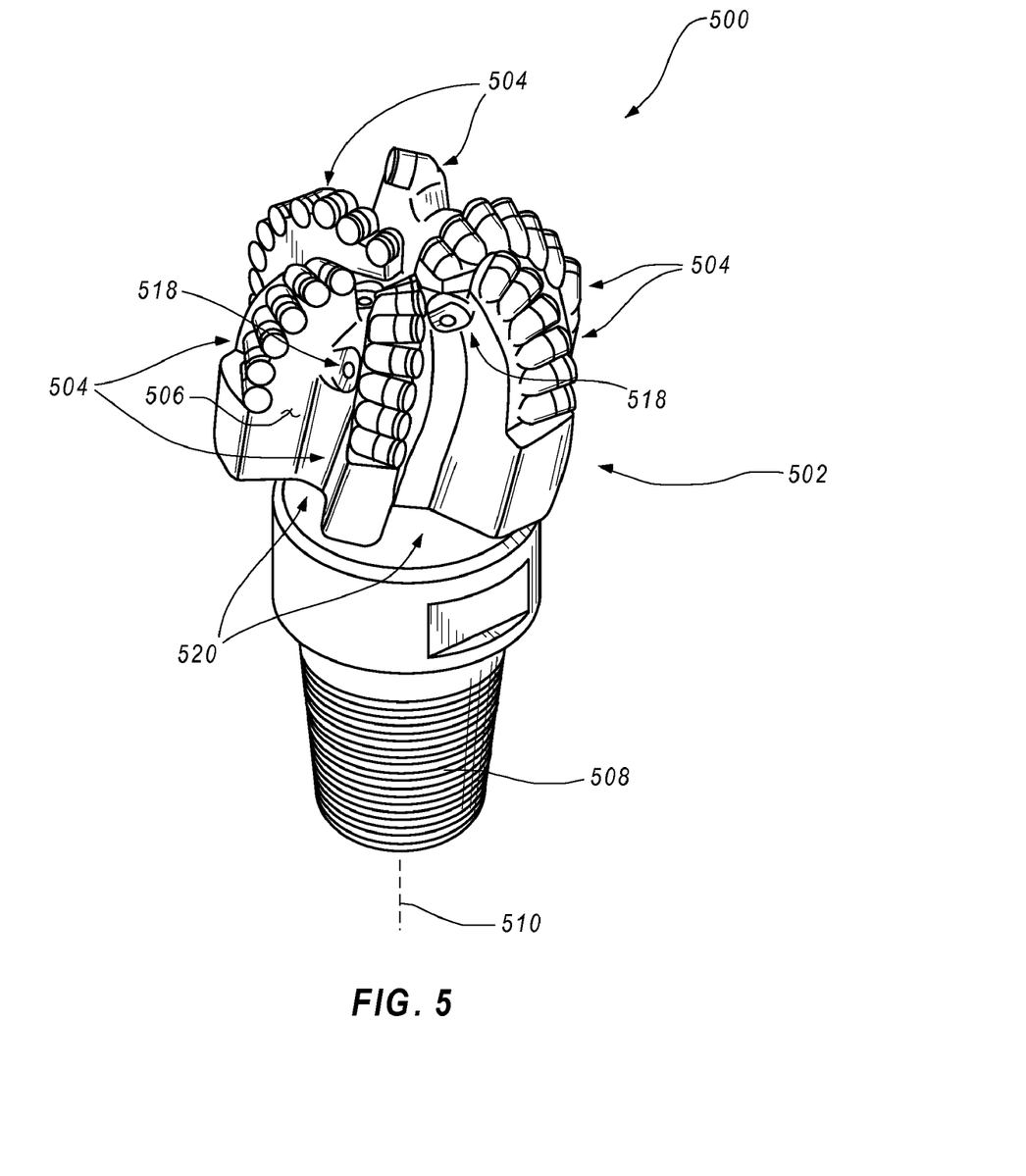
FIG. 5 is an isometric view of an embodiment of a rotary drill bit that may employ one or more of the disclosed PDC embodiments.
Figure 6:
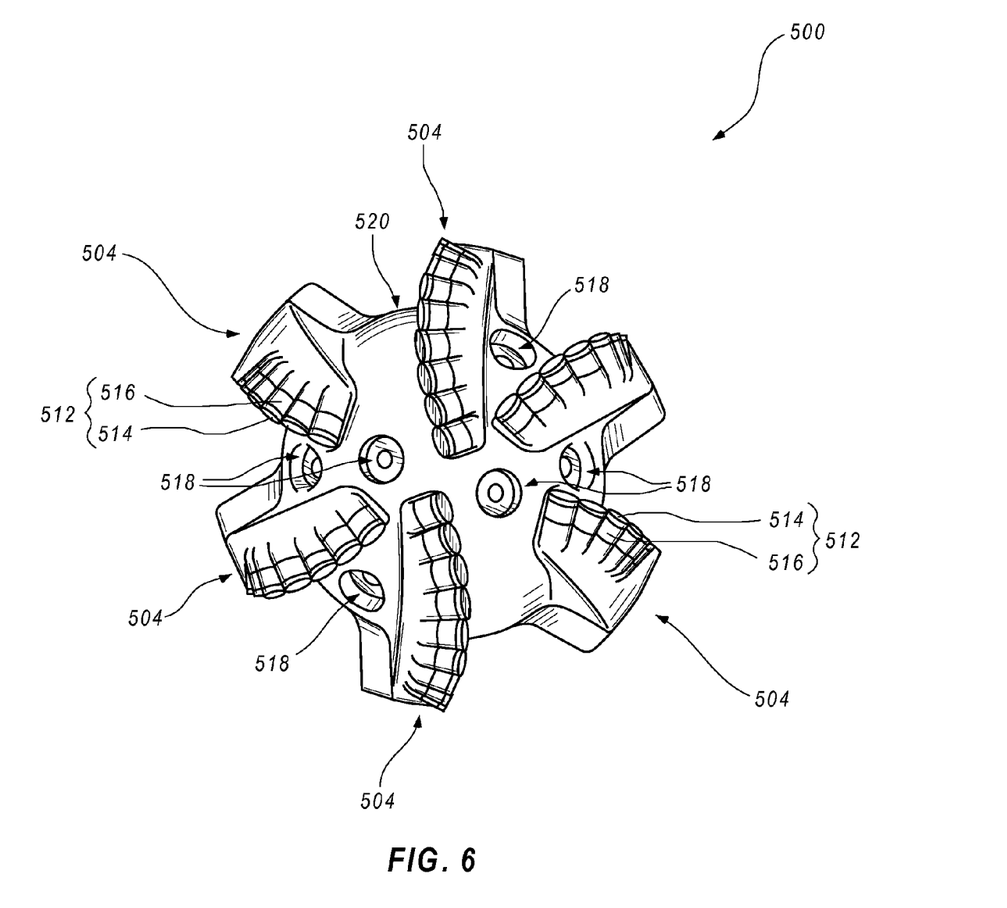
FIG. 6 is a top elevation view of the rotary drill bit shown in FIG. 5.

FIG. 5 is an isometric view and FIG. 6 is a top elevation view of an embodiment of a rotary drill bit 500. The rotary drill bit 500 includes at least one PDC configured according to any of the previously described PDC embodiments, such as the PDC 100 of FIGS. 1A-1C, the PDC 400 of FIG. 4A, or the PDC 440 of FIG. 4B. The rotary drill bit 500 comprises a bit body 502 that includes radially and longitudinally extending blades 504 having leading faces 506, and a threaded pin connection 508 for connecting the bit body 502 to a drilling string. The bit body 502 defines a leading end structure for drilling into a subterranean formation by rotation about a longitudinal axis 510 and application of weight-on-bit. At least one PDC, configured according to any of the previously described PDC embodiments, may be affixed to the bit body 502. With reference to FIG. 6, a plurality of PDCs 512 are secured to the blades 504 of the bit body 502 (FIG. 5). For example, each PDC 512 may include a thermally-stable PCD body 514 held in a barrier receptacle (not shown) carried by a substrate 516. More generally, the PDCs 512 may comprise any PDC disclosed herein, without limitation. In addition, if desired, in some embodiments, a number of the PDCs 512 may be conventional in construction. Also, circumferentially adjacent blades 504 define so-called junk slots 520 therebetween. Additionally, the rotary drill bit 500 includes a plurality of nozzle cavities 518 for communicating drilling fluid from the interior of the rotary drill bit 500 to the PDCs 512.

FIGS. 5 and 6 merely depict one embodiment of a rotary drill bit that employs at least one PDC fabricated and structured in accordance with the disclosed embodiments, without limitation. The rotary drill bit 500 is used to represent any number of earth-boring tools or drilling tools, including, for example, core bits, roller-cone bits, fixed-cutter bits, eccentric bits, bicenter bits, reamers, reamer wings, or any other downhole tool including superabrasive compacts, without limitation.

The PDCs disclosed herein (e.g., the PDC 100 shown in FIGS. 1A-1C) may also be utilized in applications other than cutting technology. For example, the disclosed PDC embodiments may be used in wire dies, bearings, artificial joints, inserts, cutting elements, and heat sinks. Thus, any of the PDCs disclosed herein may be employed in an article of manufacture including at least one superabrasive element or compact.

Thus, the embodiments of PDCs disclosed herein may be used in any apparatus or structure in which at least one conventional PDC is typically used. In one embodiment, a rotor and a stator, assembled to form a thrust-bearing apparatus, may each include one or more PDCs (e.g., the PDC 100 shown in FIGS. 1A-1C) configured according to any of the embodiments disclosed herein and may be operably assembled to a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing superabrasive compacts disclosed herein may be incorporated. The embodiments of PDCs disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the PDCs disclosed herein are disclosed in U.S. Pat. Nos. 4,811,801; 4,274,900; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:

1. A polycrystalline diamond compact for use in a subterranean drilling apparatus, comprising:
   a substrate including a plurality of substrate recesses formed therein;
   a plurality of barrier receptacles each of which is made from a refractory material and defines a receptacle recess, each of the plurality of barrier receptacles received by a corresponding one of the plurality of substrate recesses; and a plurality of thermally-stable polycrystalline diamond bodies each of which includes an upper surface, a back surface, and at least one lateral surface, each of the plurality of thermally-stable polycrystalline diamond bodies at least partially received by a corresponding one of the plurality of receptacle recesses, the back surface and at least a portion of the at least one lateral surface of each of the plurality of thermally-stable polycrystalline diamond bodies directly bonded to a corresponding one of the plurality of barrier receptacles.

2. The polycrystalline diamond compact of claim 1 wherein:
each of the plurality of the barrier receptacles is high-pressure/high-temperature bonded to the substrate; and
the back surface and the at least a portion of the at least one lateral surface of each of the plurality of thermally-stable polycrystalline diamond bodies are high-pressure/high-temperature bonded to the corresponding one of the plurality of barrier receptacles.

3. The polycrystalline diamond compact of claim 1 wherein each of the plurality of barrier receptacles and each of the plurality of thermally-stable polycrystalline diamond bodies are interference fit with the substrate.

4. The polycrystalline diamond compact of claim 1 wherein the barrier receptacle comprises at least one refractory material selected from the group consisting of tungsten, zirconium, niobium, vanadium, molybdenum, tantalum, and alloys thereof.

5. The polycrystalline diamond compact of claim 1 wherein the at least one lateral surface of each of the plurality of thermally-stable polycrystalline diamond bodies is substantially completely covered by the barrier receptacle.

6. The polycrystalline diamond compact of claim 1 wherein the at least one lateral surface of each of the plurality of thermally-stable polycrystalline diamond bodies comprises an exposed first portion extending from the corresponding one of the plurality of barrier receptacles and a second portion bonded to the corresponding one of the plurality of barrier receptacles.

7. The polycrystalline diamond compact of claim 1 wherein the substrate comprises an upper surface and wherein the upper surface of each of the plurality of thermally-stable polycrystalline diamond bodies is substantially co-planar with the upper surface of the substrate.

8. The polycrystalline diamond compact of claim 1 wherein at least one of the plurality of thermally-stable polycrystalline diamond bodies comprises an at least partially leached polycrystalline diamond body.

9. The polycrystalline diamond compact of claim 1 wherein at least one of the plurality of thermally-stable polycrystalline diamond bodies comprises a plurality of bonded diamond grains defining a plurality of interstitial regions including at least one of silicon carbide, cobalt carbide, a cobalt-silicon alloy, or a nonmetallic catalyst disposed therein.

10. The polycrystalline diamond compact of claim 1 wherein a generally cylindrical lateral periphery of the polycrystalline diamond compact is partially defined by the at least one lateral surface of each of the plurality of thermally-stable polycrystalline diamond bodies.

11. The polycrystalline diamond compact of claim 1 wherein a generally cylindrical lateral periphery of the polycrystalline diamond compact is defined by the substrate.

12. A rotary drill bit comprising a bit body including a plurality of polycrystalline diamond cutting elements affixed thereto, at least one of the plurality of polycrystalline diamond cutting elements configured as the polycrystalline diamond compact of claim 1.

13. A polycrystalline diamond compact for use in a subterranean drilling apparatus, comprising:
a substrate including a plurality of substrate recesses formed therein;
a plurality of barrier receptacles each of which defines a receptacle recess, each of the plurality of barrier receptacles received by a corresponding one of the plurality of substrate recesses; and
a plurality of thermally-stable polycrystalline diamond bodies each of which includes an upper surface, a back surface, and at least one lateral surface, each of the plurality of thermally-stable polycrystalline diamond bodies at least partially received by a corresponding one of the plurality of receptacle recesses, the at least one lateral surface of each of the plurality of thermally-stable polycrystalline diamond bodies including an exposed first portion extending from a corresponding one of the plurality of barrier receptacles and a second portion bonded to the corresponding one of the plurality of barrier receptacles.

14. The polycrystalline diamond compact of claim 13 wherein:
each of the plurality of the barrier receptacles is high-pressure/high-temperature bonded to the substrate; and
the back surface and the at least a portion of the at least one lateral surface of each of the plurality of thermally-stable polycrystalline diamond bodies are high-pressure/high-temperature bonded to the corresponding one of the plurality of barrier receptacles.

15. The polycrystalline diamond compact of claim 13 wherein each of the plurality of barrier receptacles and each of the plurality of thermally-stable polycrystalline diamond bodies are interference fit with the substrate.

16. The polycrystalline diamond compact of claim 13 wherein the at least one lateral surface of each of the plurality of thermally-stable polycrystalline diamond bodies is substantially completely covered by the barrier receptacle.

17. The polycrystalline diamond compact of claim 13 wherein the substrate comprises an upper surface and wherein the upper surface of each of the plurality of thermally-stable polycrystalline diamond bodies is substantially co-planar with the upper surface of the substrate.

18. The polycrystalline diamond compact of claim 13 wherein at least one of the plurality of thermally-stable polycrystalline diamond bodies comprises an at least partially leached polycrystalline diamond body.

19. The polycrystalline diamond compact of claim 13 wherein at least one of the plurality of thermally-stable polycrystalline diamond bodies comprises a plurality of bonded diamond grains defining a plurality of interstitial regions including at least one of silicon carbide, cobalt carbide, a cobalt-silicon alloy, or a nonmetallic catalyst disposed therein.

20. The polycrystalline diamond compact of claim 13 wherein a generally cylindrical lateral periphery of the polycrystalline diamond compact is partially defined by the at least one lateral surface of each of the plurality of thermally-stable polycrystalline diamond bodies.

21. The polycrystalline diamond compact of claim 13 wherein a generally cylindrical lateral periphery of the polycrystalline diamond compact is defined by the substrate.

22. The polycrystalline diamond compact of claim 13 wherein each of the plurality of barrier receptacles is made from a refractory material.

23. The polycrystalline diamond compact of claim 22 wherein the refractory material comprises at least one refractory material selected from the group consisting of tungsten, zirconium, niobium, vanadium, molybdenum, tantalum, and alloys thereof.

24. A rotary drill bit comprising a bit body including a plurality of polycrystalline diamond cutting elements affixed thereto, at least one of the plurality of polycrystalline diamond cutting elements configured as the polycrystalline diamond compact of claim 13.

* * * * *